(12) United States Patent
Chaillie

(10) Patent No.: US 11,840,151 B2
(45) Date of Patent: Dec. 12, 2023

(54) DEVICE FOR ENCAPSULATING AND INTERRUPTING THE POWER SUPPLY OF A BATTERY

(71) Applicant: Renault s.a.s., Boulogne-Billancourt (FR)

(72) Inventor: Frederic Chaillie, La Boissiere Ecole (FR)

(73) Assignee: Renault s.a.s., Boulogne-Billancourt (FR)

( * ) Notice: Subject to any disclaimer, the term of this patent is extended or adjusted under 35 U.S.C. 154(b) by 625 days.

(21) Appl. No.: 16/621,961

(22) PCT Filed: Jun. 4, 2018

(86) PCT No.: PCT/FR2018/051287
§ 371 (c)(1),
(2) Date: Dec. 12, 2019

(87) PCT Pub. No.: WO2018/229386
PCT Pub. Date: Dec. 20, 2018

(65) Prior Publication Data
US 2020/0212394 A1 Jul. 2, 2020

(30) Foreign Application Priority Data
Jun. 14, 2017 (FR) .................................... 1755341

(51) Int. Cl.
| | |
|---|---|
| *B60K 1/04* | (2019.01) |
| *B60L 50/64* | (2019.01) |
| *B60L 50/60* | (2019.01) |
| *B60K 28/00* | (2006.01) |
| *H01H 3/02* | (2006.01) |
| *H01M 50/271* | (2021.01) |

(Continued)

(52) U.S. Cl.
CPC .............. *B60L 50/64* (2019.02); *B60K 28/00* (2013.01); *B60L 50/60* (2019.02); *H01H 3/02* (2013.01); *H01M 50/202* (2021.01); *H01M 50/271* (2021.01); *H01M 50/574* (2021.01); *B60K 2028/006* (2013.01); *H01M 2200/20* (2013.01)

(58) Field of Classification Search
CPC .... B60K 28/00; B60K 2028/006; H01H 3/02; H01M 50/20; H01M 2200/20; H01M 50/202; B60L 50/66; B60L 50/64
See application file for complete search history.

(56) References Cited

U.S. PATENT DOCUMENTS 5,534,364 A * 7/1996 Watanabe ........... H01M 50/244
429/150
2002/0016108 A1 * 2/2002 Creze ..................... H01R 13/33
439/843

(Continued)

OTHER PUBLICATIONS

International Search Report dated Sep. 26, 2018 in PCT/FR2018/051287 filed on Jun. 4, 2018, 2 pages.

*Primary Examiner* — James A English
*Assistant Examiner* — James J Triggs
(74) *Attorney, Agent, or Firm* — Oblon, McClelland, Maier & Neustadt, L.L.P.

(57) ABSTRACT

A device for encapsulating a battery includes an enclosure including a casing and a cover and forming a housing for receiving the battery, a circuit breaker arranged in the enclosure, and an actuating element of the circuit breaker arranged outside the enclosure or partially outside the enclosure.

14 Claims, 2 Drawing Sheets

(51) Int. Cl.
*H01M 50/574* (2021.01)
*H01M 50/202* (2021.01)

(56) References Cited

U.S. PATENT DOCUMENTS

2013/0241493 A1  9/2013  Kosaki et al.
2015/0061413 A1  3/2015  Janarthanam et al.
2017/0271875 A1* 9/2017  Narla .................. H02S 40/38

* cited by examiner

DEVICE FOR ENCAPSULATING AND INTERRUPTING THE POWER SUPPLY OF A BATTERY

BACKGROUND

The invention relates to an encapsulation device for a battery or a device for encapsulating a battery.

The invention also relates to an assembly comprising such an encapsulation device and a battery mounted in the encapsulation device.

Finally, the invention relates to a vehicle comprising such an encapsulation device or such an assembly.

All motor vehicles comprise at least one battery. In order to safeguard the occupants and personnel working on the vehicle in the event of maintenance or of an accident, vehicle batteries are equipped with SDSWs (Safety Disconnect Switches). On numerous electrical vehicles, the disconnect switch can be accessed from the passenger compartment, concealed by a panel whereby it is considered to be protected against moisture and the weather. The lack of accessibility from outside the vehicle to such a disconnect switch often means that emergency response teams have to completely cut the electrical cables connected to the battery.

BRIEF SUMMARY

The aim of the invention is to provide a device for encapsulating a battery that overcomes the aforementioned disadvantages and improves the known battery power supply disconnect switch devices of the prior art.

To this end, the invention relates to a device for encapsulating a battery comprising: an enclosure comprising a casing and a cover and forming a housing for receiving the battery, a disconnect switch arranged in the enclosure, and an element for actuating the disconnect switch that is arranged outside the enclosure or partially outside the enclosure.

Advantageously, the device comprises a first, a second and a third electrical line and a first and a second electrical line output element. The first electrical line is intended to connect a first terminal of the battery to a first electrical line output element. The second electrical line is intended to connect a second terminal of the battery to the disconnect switch and the third electrical line is intended to connect the disconnect switch to a second electrical line output element.

In particular, the device can comprise a second disconnect switch comprising a first and a second relay, with the first relay on the first electrical line and the second relay on the third electrical line or on the second electrical line.

Advantageously, the disconnect switch can comprise a first electrical contact, particularly a first male electrical contact, a second electrical contact, particularly a second female electrical contact, and a third electrical contact, particularly a third female electrical contact.

Furthermore, the second electrical contact and the third electrical contact can be mounted in one or two insulating rings, which are mounted in the casing and/or the cover, and in that the first electrical contact is rigidly connected to the actuating element.

In particular, the first electrical contact can be freely mounted, particularly to freely translate and/or rotate, relative to the second electrical contact and to the third electrical contact.

Advantageously, the electrical contacts can be arranged so that the first electrical contact has a first position, in which the second and third electrical contacts are each electrically connected to the first electrical contact and so that the first electrical contact has a second position, in which at least one of the second and third electrical contacts is not electrically connected to the first electrical contact.

Furthermore, the actuating element can comprise a manual gripping element.

In particular, the actuating element can comprise an electrical actuator.

The present invention further relates to an assembly comprising a device as defined above and a battery mounted in said device.

The present invention also relates to a vehicle comprising a device for encapsulating a battery as defined above or an assembly as defined above.

BRIEF DESCRIPTION OF THE DRAWINGS

These aims, features and advantages of the present invention will be described in detail in the following description of an embodiment of a battery encapsulation device according to the invention, which description is provided in a non-limiting manner with reference to the accompanying drawings, in which.

DETAILED DESCRIPTION

Figure 1:
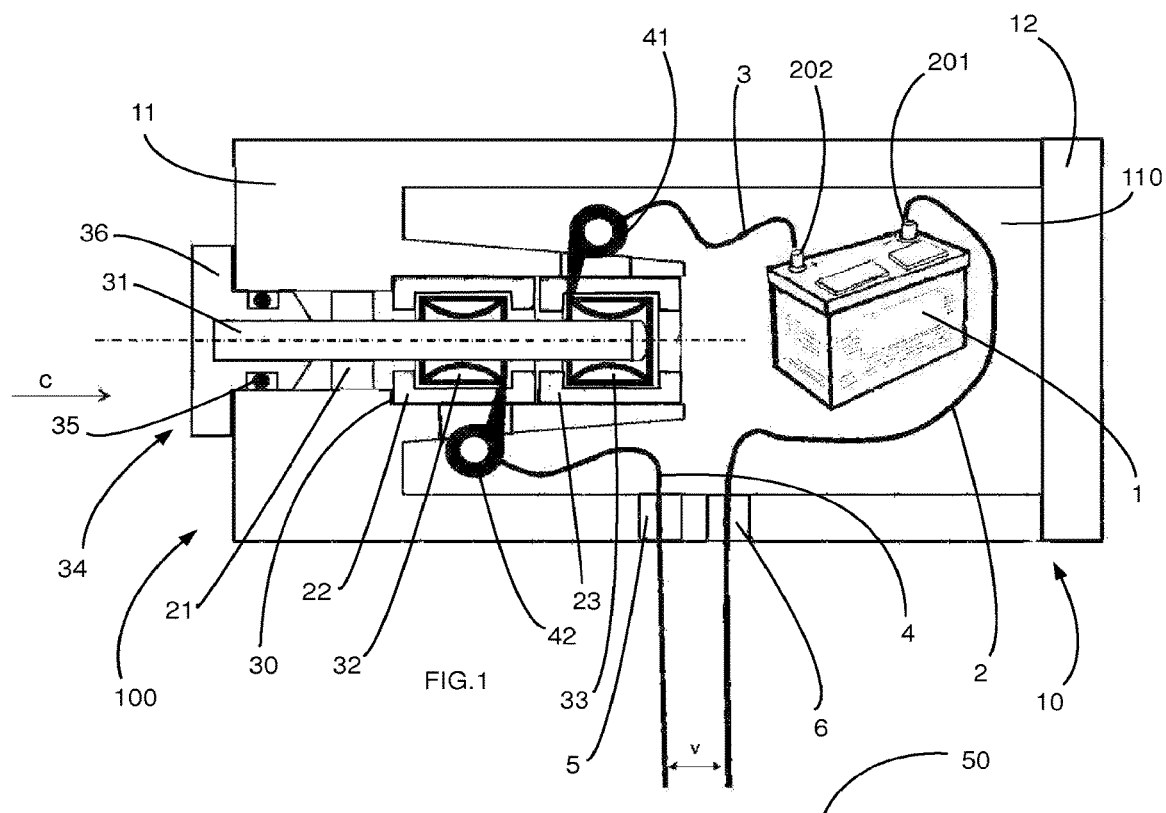
FIG. 1 shows a device for encapsulating a battery according to one embodiment.
Figure 2:
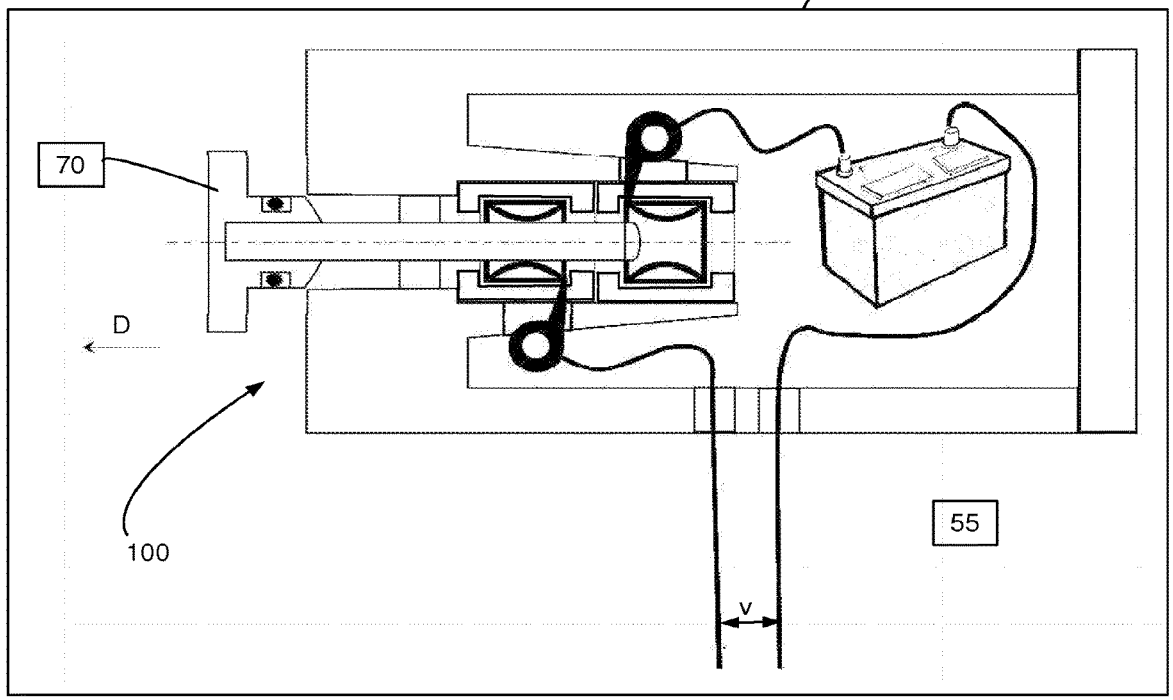
FIG. 2 shows a vehicle comprising the device for encapsulating a battery.
Figure 3:
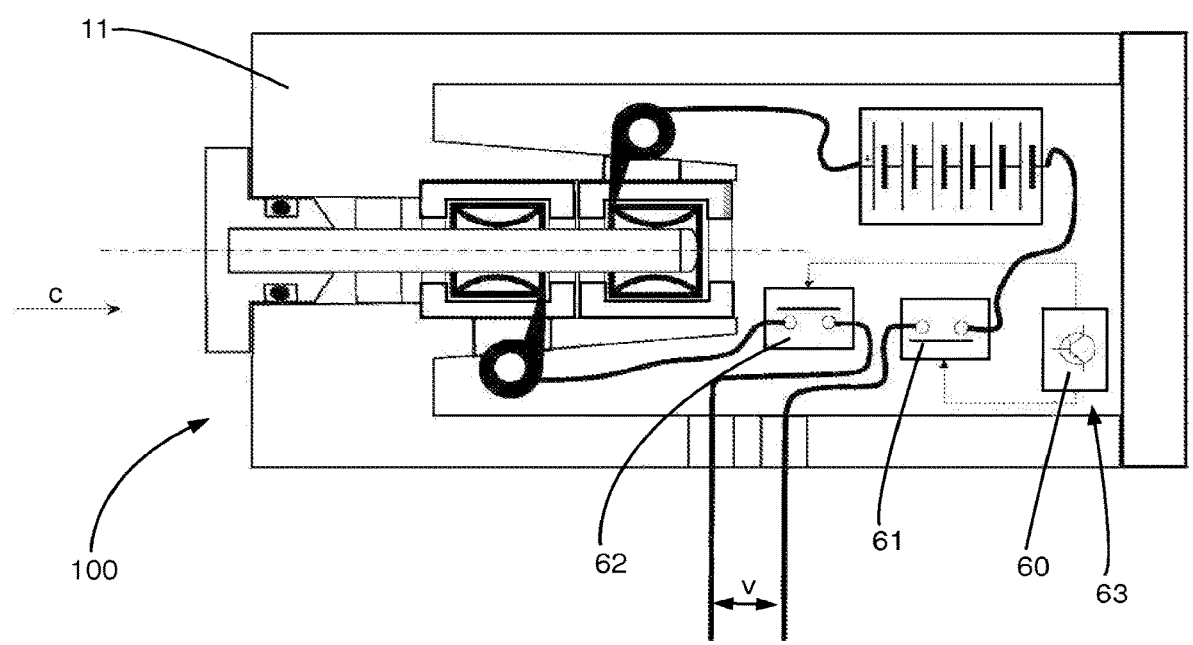
FIG. 3 shows a device for encapsulating a battery according to an alternative embodiment.

An embodiment of a vehicle 50 is described hereafter with reference to FIGS. 1 to 3.

The vehicle is preferably of the motor vehicle type with a heat or electric or hybrid engine.

The vehicle 50 comprises a device 100 for encapsulating a battery 1. The device 100 comprises an enclosure 10, the enclosure 10 comprising a casing 11 and a cover 12. The casing 11 and the cover 12 form a housing 110 for accommodating the battery 1. When the cover 12 closes the casing 11, the housing 110 is liquid-tight and dust-tight. The enclosure 10 is made of electrically insulating material.

In the case of a vehicle with a heat engine, the battery is, for example, a battery for powering electrical equipment of the vehicle.

In the case of a vehicle with an electric or hybrid engine, the battery is, for example, a battery for powering an electric motor for driving the vehicle.

The device 100 comprises a disconnect switch 30 arranged in the enclosure 10.

The device 100 comprises an element 34 for actuating the disconnect switch. The actuating element 34 is arranged outside the enclosure 10 or partially outside the enclosure. The actuating element 34 can comprise a gripping element 36. The gripping element 36 can be disposed at the outer end of the actuating element 34. A seal 35 is advantageously provided between the actuating element 34 and the casing 11. The seal 35 is disposed, for example, in a recess surrounding the inner surface of the actuating element 34 and intended to come into contact with the casing 11. The seal 35 advantageously is formed by a ring made of elastic materials, for example, of rubber. Advantageously, the gripping element 36 is formed by electrically insulating material. Advantageously, the gripping element is in the form of a button.

The device 100 comprises a first electrical line 2 connecting a first terminal 201 of the battery 1 to a first electrical line output element or terminal 5. The device 100 comprises a second electrical line 3 connecting a second terminal 202 of the battery 1 to the disconnect switch 30. A first wired connection 41 connects the second electrical line 3 to the disconnect switch 30. The device 100 comprises a third electrical line 4 connecting the disconnect switch 30 to a second electrical line output element or terminal 6. A second wired link 42 connects the third electrical line to the disconnect switch 30. The first and the second electrical line output elements 5, 6 are intended to maintain the seal of the housing 110. To this end, these elements are integrated into a wall of the enclosure, particularly into a wall of the casing and/or of the cover. They provide a galvanic connection between the inside and the outside of the enclosure.

The disconnect switch 30 comprises a first electrical contact 31, particularly a first male electrical contact 31. The first electrical contact 31 is rigidly connected to the actuating element 34. The first electrical contact 31 is freely mounted, particularly to freely translate and/or rotate, relative to a first insulating ring 21 and/or relative to the enclosure. The first electrical contact 31 is generally of cylindrical shape made of conductive material. It is particularly formed by a copper or copper alloy conducting shaft or even made of any other conducting material. The gripping element 36 is fixed on a section of the conducting shaft outside the enclosure 110.

The disconnect switch 30 comprises a second electrical contact 32, particularly a second female electrical contact 32. The second electrical contact 32 is generally in the shape of a ring or of an arc of a ring. The second electrical contact engages with the first electrical contact 31 by sliding in relation to each other. The second electrical contact 32 is mounted in a second insulating ring 22 and/or is fixedly mounted relative to the enclosure. The second insulating ring 22 is mounted in the casing 11 and/or in the cover 12. The second insulating ring 22 advantageously is of cylindrical shape.

The disconnect switch 30 comprises a third electrical contact 33, particularly a third female electrical contact 33. The third electrical contact 33 is generally in the shape of a ring or of an arc of a ring. The third electrical contact engages with the first electrical contact 31 by sliding in relation to each other. The third electrical contact 33 is mounted in a third insulating ring 23 and/or is fixedly mounted relative to the enclosure. The third insulating ring 23 is mounted in the casing 11 and/or in the cover 12. The third insulating ring 23 advantageously is of cylindrical shape.

The second and the third electrical contacts 32, 33 are made of electrically conducting material so as to be in electrical contact when the first electrical contact 31 engages therewith. Advantageously, the second and the third electrical contacts 32, 33 comprise a conductive leaf spring in order to maintain galvanic contact with the first electrical contact 31 when the first contact is introduced at the first and second contacts.

The disconnect switch 30 is arranged in a bore in a wall of the casing. Advantageously, the disconnect switch 30 is arranged in a bore disposed opposite the cover 12.

The first electrical contact 31 is freely mounted, particularly to freely translate and/or rotate, relative to the second electrical contact 32 and to the third electrical contact 33.

The electrical contacts are arranged so that the first electrical contact 31 has a first position corresponding to a first position of the actuating element, in which the second and third electrical contacts 32, 33 are each electrically connected to the first electrical contact 31. In this configuration, the terminal 202 is electrically connected to the terminal 5. Furthermore, the first electrical contact has a second position corresponding to a second position of the actuating element, in which at least one of the second and third electrical contacts is not electrically connected to the first electrical contact 31. The transition from the first position of the actuating element to the second position of the actuating element, or vice versa, preferably occurs through a translation movement of the first electrical contact 31 along its axis.

The actuating element 34 can comprise an electrical actuator 70, as shown in FIG. 2. The electrical actuator 70 is able to actuate the disconnect switch 30 without any manual intervention. According to one embodiment, the electrical actuator 70 is able to switch the actuating element 34 from its first position to its second position and, vice versa, it is able to switch the actuating element 34 from its second position to its first position. The electrical actuator changes the position of the actuating element 34, for example, by actuating an electrical coil.

According to the alternative embodiment shown in FIG. 3, a second electronic disconnect switch 63 is disposed in the enclosure 10. The second electronic disconnect switch 63 comprises a first and a second relay 61, 62. The first relay 61 is intended to open or close the first electrical line 2 and the second relay 62 is intended to open or close the third electrical line 4. The second disconnect switch 63 also comprises a unit for controlling the first and second relays. The second electronic disconnect switch 63 is able to interrupt the electrical circuit of the battery 1 independently of the disconnect switch 30, for example, following a command from a control unit 55 of the vehicle 50. The first and the second relays 61, 62 are open control relays, i.e. without an electronic command the contacts of the relays 61, 62 are closed.

The operation of the device 100 will now be described hereafter with reference to FIG. 1.

With respect to a vehicle 50 comprising a device 100 and a battery 1 disposed in the enclosure 10 of the device 100, the battery 1 is connected to the first and to the second electrical lines 2, 3. When the actuating element 34 is in the function position or in the actuated position, the first electrical contact 31 is in the first position, thus allowing the second electrical line 3 to be electrically connected to the third electrical line 4. In the alternative embodiment, in addition to the function actuating element, the disconnect switch 63 must be in the function configuration, i.e. the control unit 60 does not electrically power the first and the second relay 61, 62.

When the battery 1 powers the electrical and/or electronic circuit of the vehicle 50, it is possible to interrupt the electrical power supply originating from the battery 1 using the disconnect switch 30. The power supply is interrupted by actuating the disconnect switch using the manual gripping element 36 so as to place the first electrical contact 31 in the second position and thus interrupt the electrical connection between the second electrical line 3 and the third electrical line 4.

The actuating element 34 is also controlled by the electrical actuator 70. For example, when the electrical actuator 70 is supplied with electricity, an electric current is established in a coil disposed inside the electrical actuator 70. This coil creates a magnetic field able to cause the position of the actuating element 34 to be changed.

According to the alternative embodiment, it is also possible to control the interruption of the power supply originating from the battery 1 using the second electronic disconnect switch 63. When the second electronic disconnect switch is actuated, it opens the first and the second relays 61, 62, thus interrupting the electrical power supply originating from the battery 1.

Advantageously, the encapsulation device 100 allows the power supply originating from a battery 1 to be interrupted or triggered, whilst keeping the battery in a sealed housing 110.

The invention claimed is:

1. A device for encapsulating a battery comprising:
an enclosure comprising a casing and a cover and forming a housing for accommodating the battery;
a disconnect switch arranged in the enclosure; and
an element for actuating the disconnect switch that is arranged outside the enclosure or partially outside the enclosure,
wherein the disconnect switch comprises a first electrical contact, a second electrical contact, and a third electrical contact arranged in the enclosure,
wherein the first electrical contact is a first male electrical contact, the second electrical contact is a first female electrical contact, and the third electrical contact is a second female electrical contact, and
wherein the electrical contacts are arranged so that the first electrical contact has a first position in which the second and third electrical contacts are each electrically connected to the first electrical contact and so that the first electrical contact has a second position in which at least one of the second and third electrical contacts is not electrically connected to the first electrical contact.

2. The device as claimed in claim 1, further comprising:
a first, a second and a third electrical line and a first and a second electrical line output element, the first electrical line being configured to connect a first terminal of the battery to the first electrical line output element, the second electrical line being configured to connect a second terminal of the battery to the disconnect switch, and the third electrical line being configured to connect the disconnect switch to the second electrical line output element.

3. The device as claimed in claim 2, further comprising a second disconnect switch comprising a first and a second relay, with the first relay on the first electrical line and the second relay on the third electrical line or on the second electrical line.

4. The device as claimed in claim 1, wherein the second electrical contact and the third electrical contact are mounted in one or two insulating rings, which are mounted in the casing or the cover, and the first electrical contact is rigidly connected to the actuating element.

5. The device as claimed in claim 1, wherein the first electrical contact is mounted to freely translate or rotate relative to the second electrical contact and to the third electrical contact.

6. The device as claimed in claim 1, wherein the actuating element comprises a manual gripping element.

7. The device as claimed in claim 1, wherein the actuating element comprises an electrical actuator.

8. An assembly comprising:
the device as claimed in claim 1 and a battery mounted in the device.

9. A vehicle comprising:
the device as claimed in claim 1.

10. A device for encapsulating a battery comprising:
an enclosure comprising a casing and a cover and forming a housing for accommodating the battery;
a disconnect switch arranged in the enclosure, the disconnect switch comprises a first electrical contact, a second electrical contact, and a third electrical contact;
an element for actuating the disconnect switch that is arranged outside the enclosure or partially outside the enclosure; and
a first, a second and a third electrical line and a first and a second electrical line output element, the first electrical line being configured to connect a first terminal of the battery to the first electrical line output element, the second electrical line being configured to connect a second terminal of the battery to the disconnect switch, and the third electrical line being configured to connect the disconnect switch to the second electrical line output element; and
a second disconnect switch comprising a first and a second relay, with the first relay connected to the first electrical line and the second relay connected to the third electrical line or connected to the second electrical line.

11. A device for encapsulating a battery comprising:
an enclosure comprising a casing and a cover and forming a housing for accommodating the battery;
a disconnect switch arranged in the enclosure;
an element for actuating the disconnect switch that is arranged outside the enclosure or partially outside the enclosure, and the actuating element comprises a manual gripping element;
a first, a second and a third electrical line and a first and a second electrical line output element, the first electrical line being configured to connect a first terminal of the battery to the first electrical line output element, the second electrical line being configured to connect a second terminal of the battery to the disconnect switch, and the third electrical line being configured to connect the disconnect switch to the second electrical line output element; and
a second disconnect switch comprising a first and a second relay, with the first relay on the first electrical line and the second relay on the third electrical line or on the second electrical line,
wherein the disconnect switch comprises a first electrical contact, a second electrical contact, and a third electrical contact, and
wherein the second electrical contact and the third electrical contact are mounted in one or two insulating rings, which are mounted in the casing or the cover, and the first electrical contact is rigidly connected to the actuating element.

12. The device as claimed in claim 1, wherein the second electrical contact and the third electrical contact are mounted in one or two insulating rings, which are mounted in the casing and the cover, and the first electrical contact is rigidly connected to the actuating element.

13. The device as claimed in claim 1, wherein the first electrical contact is mounted to freely translate and rotate relative to the second electrical contact and to the third electrical contact.

14. The device as claimed in claim 10, wherein the electrical contacts are arranged so that the first electrical contact has a first position in which the second and third electrical contacts are each electrically connected to the first electrical contact and so that the first electrical contact has a second position in which at least one of the second and third electrical contacts is not electrically connected to the first electrical contact.

* * * * *